United States Patent
Liang

(10) Patent No.: US 12,505,562 B2
(45) Date of Patent: Dec. 23, 2025

(54) OBJECT TRACKING SYSTEM AND 3D LOCATION REPORTING METHOD

(71) Applicant: HIMAX TECHNOLOGIES LIMITED, Tainan (TW)

(72) Inventor: Kuei-Hsin Liang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 298 days.

(21) Appl. No.: 18/230,172

(22) Filed: Aug. 4, 2023

(65) Prior Publication Data
US 2025/0045935 A1    Feb. 6, 2025

(51) Int. Cl.
*G06T 7/246* (2017.01)
*G06T 7/73* (2017.01)

(52) U.S. Cl.
CPC .............. *G06T 7/248* (2017.01); *G06T 7/74* (2017.01); *G06T 2207/10024* (2013.01); *G06T 2207/10028* (2013.01); *G06T 2207/10048* (2013.01); *G06T 2207/30201* (2013.01)

(58) Field of Classification Search
CPC . G06T 7/248; G06T 7/74; G06T 2207/10024; G06T 2207/10028; G06T 2207/10048; G06T 2207/30201
See application file for complete search history.

(56) References Cited

U.S. PATENT DOCUMENTS

| | | | |
|---|---|---|---|
| 2006/0125920 A1* | 6/2006 | Criminisi | G06T 7/593 348/E5.015 |
| 2010/0265316 A1* | 10/2010 | Sali | H04N 13/254 348/46 |
| 2015/0254499 A1* | 9/2015 | Pang | G06V 20/647 382/103 |

(Continued)

FOREIGN PATENT DOCUMENTS

| | | |
|---|---|---|
| EP | 3 230 950 B1 | 9/2018 |
| JP | 2016-164811 A | 9/2016 |

(Continued)

OTHER PUBLICATIONS

Gareth Rendle et al., Volumetric Avatar Reconstruction with Spatio-Temporally Offset RGBD Cameras, 2023 IEEE Conference Virtual Reality and 3D User Interfaces (VR), 2023, pp. 72-82, XP034336518, 2023.

(Continued)

*Primary Examiner* — Pinalben Patel
(74) *Attorney, Agent, or Firm* — Winston Hsu

(57) ABSTRACT

A 3D location reporting method includes capturing a plurality of 2D image frames having a sensor frame rate and a plurality of 3D depth image frames having the sensor frame rate, wherein the plurality of 2D image frames and the plurality of 3D depth image frames are interleaved, and a first 2D image frame of the plurality of 2D image frames is captured earlier than a first 3D depth image frame of the plurality of 3D depth image frames; calculating a first 3D (Continued)

location according to an N-th 2D image frame of the plurality of 2D image frames and an N-th 3D depth image frame of the plurality of 3D depth image frames; and calculating a second 3D location according to the N-th 3D depth image frame and an (N+1)-th 2D image frame of the plurality of 2D image frames.

10 Claims, 4 Drawing Sheets

(56) References Cited

U.S. PATENT DOCUMENTS

| | | | | |
|---|---|---|---|---|
| 2016/0171768 A1* | 6/2016 | Park | ..................... | H04N 13/167 348/42 |
| 2020/0357136 A1* | 11/2020 | Qiao | ....................... | G06T 7/248 |

FOREIGN PATENT DOCUMENTS

| | | | | |
|---|---|---|---|---|
| JP | 2021-99367 A | | 7/2021 | |
| KR | 20230038584 A | * | 3/2023 | ............... G06T 7/70 |

OTHER PUBLICATIONS

Peyman Gholami et al., AutoDepthNet: High Frame Rate Depth Map Reconstruction using Commodity Depth and RGB Cameras, May 24, 2023, XP091517248 ,May 24, 2023.

Ming-Ze Yuan et al., Temporal Upsampling of Depth Maps Using a Hybrid Camera, IEEE Transactions on Visualization and Computer Graphics, 2017, pp. 1-13, XP081037510 ,Jul. 2017.

* cited by examiner

OBJECT TRACKING SYSTEM AND 3D LOCATION REPORTING METHOD

BACKGROUND OF THE INVENTION

1. Field of the Invention

The present invention relates to an object tracking system and a 3D location reporting method, and more particularly, to an object tracking system and a 3D location reporting method reporting 3D locations when each frame image is received.

2. Description of the Prior Art

As computer 3D vision applications become more mature and human-computer interaction sensing technology advances with the metaverse trend, smooth visual experiences require high frame rate tracking for applications such as virtual reality, augmented reality and 3D naked vision. These applications need to track features such as face, eyes, gesture and posture by using RGB or grayscale images and depth images to get the three-dimensional (3D) coordinates of the landmarks on the objects in the real world.

Under this circumstance, how to maximize the reporting rate of the 3D coordinates of the landmarks has become one of the goals in the industry.

SUMMARY OF THE INVENTION

The present invention is to provide an object tracking system and a 3D location reporting method to solve the above problems.

An embodiment of the present invention provides an object tracking system, including a sensor, configured to capture a plurality of 2D image frames having a sensor frame rate and a plurality of 3D depth image frames having the sensor frame rate, wherein the plurality of 2D image frames and the plurality of 3D depth image frames are interleaved, and a first 2D image frame of the plurality of 2D image frames is captured earlier than a first 3D depth image frame of the plurality of 3D depth image frames; a processor, coupled to the sensor; and a memory, coupled to the processor, configured to store a program code for instructing the processor to execute a 3D location reporting method, and the 3D location reporting method includes calculating a first 3D location according to an N-th 2D image frame of the plurality of 2D image frames and an N-th 3D depth image frame of the plurality of 3D depth image frames; and calculating a second 3D location according to the N-th 3D depth image frame and an (N+1)-th 2D image frame of the plurality of 2D image frames.

An embodiment of the present invention provides a 3D location reporting method, including capturing a plurality of 2D image frames having a sensor frame rate and a plurality of 3D depth image frames having the sensor frame rate, wherein the plurality of 2D image frames and the plurality of 3D depth image frames are interleaved, and a first 2D image frame of the plurality of 2D image frames is captured earlier than a first 3D depth image frame of the plurality of 3D depth image frames; calculating a first 3D location according to an N-th 2D image frame of the plurality of 2D image frames and an N-th 3D depth image frame of the plurality of 3D depth image frames; and calculating a second 3D location according to the N-th 3D depth image frame and an (N+1)-th 2D image frame of the plurality of 2D image frames.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
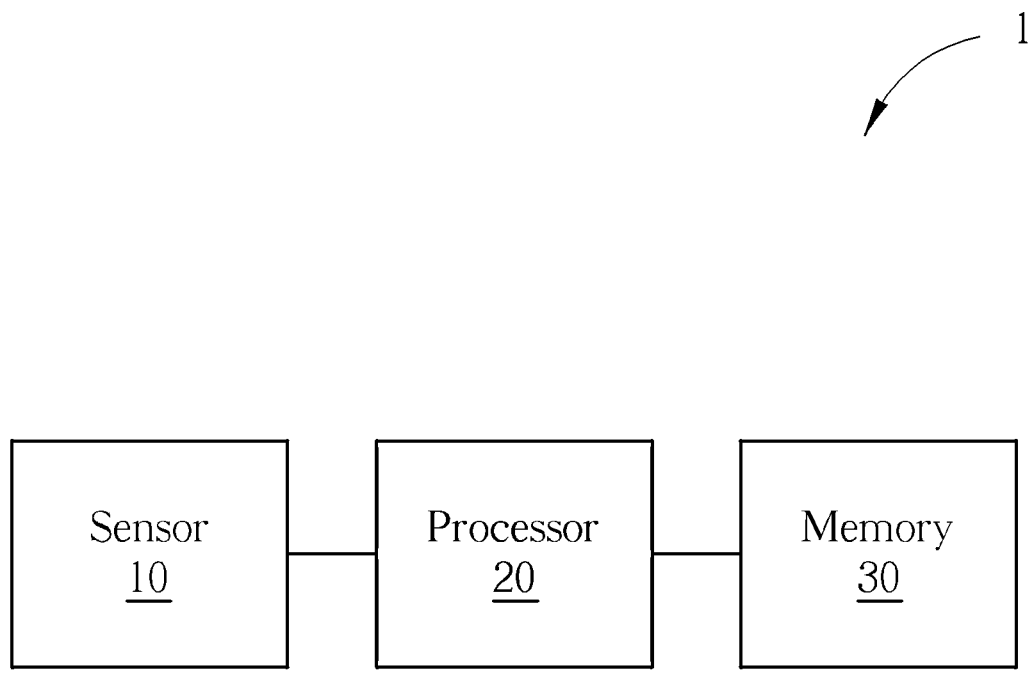
FIG. 1 is a schematic diagram of an object tracking system according to an embodiment of the present invention.

Please refer to FIG. 1. FIG. 1 is a schematic diagram of an object tracking system 1 according to an embodiment of the present invention. The object tracking system 1 includes a sensor 10, a processor 20 and a memory 30. The sensor 10 and the memory 30 are coupled to the processor 20, which are used to represent basic components of the object tracking system 1. The sensor 10 captures a plurality of 2D image frames having a sensor frame rate and a plurality of 3D depth image frames having the sensor frame rate. It should be noted that the plurality of 2D image frames may be near infrared (NIR) image frames, RGB image frames or greyscale image frames, etc., but not limited thereto. The memory 30 stores a program code for instructing the processor 20 to execute a 3D location reporting method, so that the processor 20 generates 3D locations of a landmark of an object and maximizes a reporting rate of the 3D locations.

Figure 2:
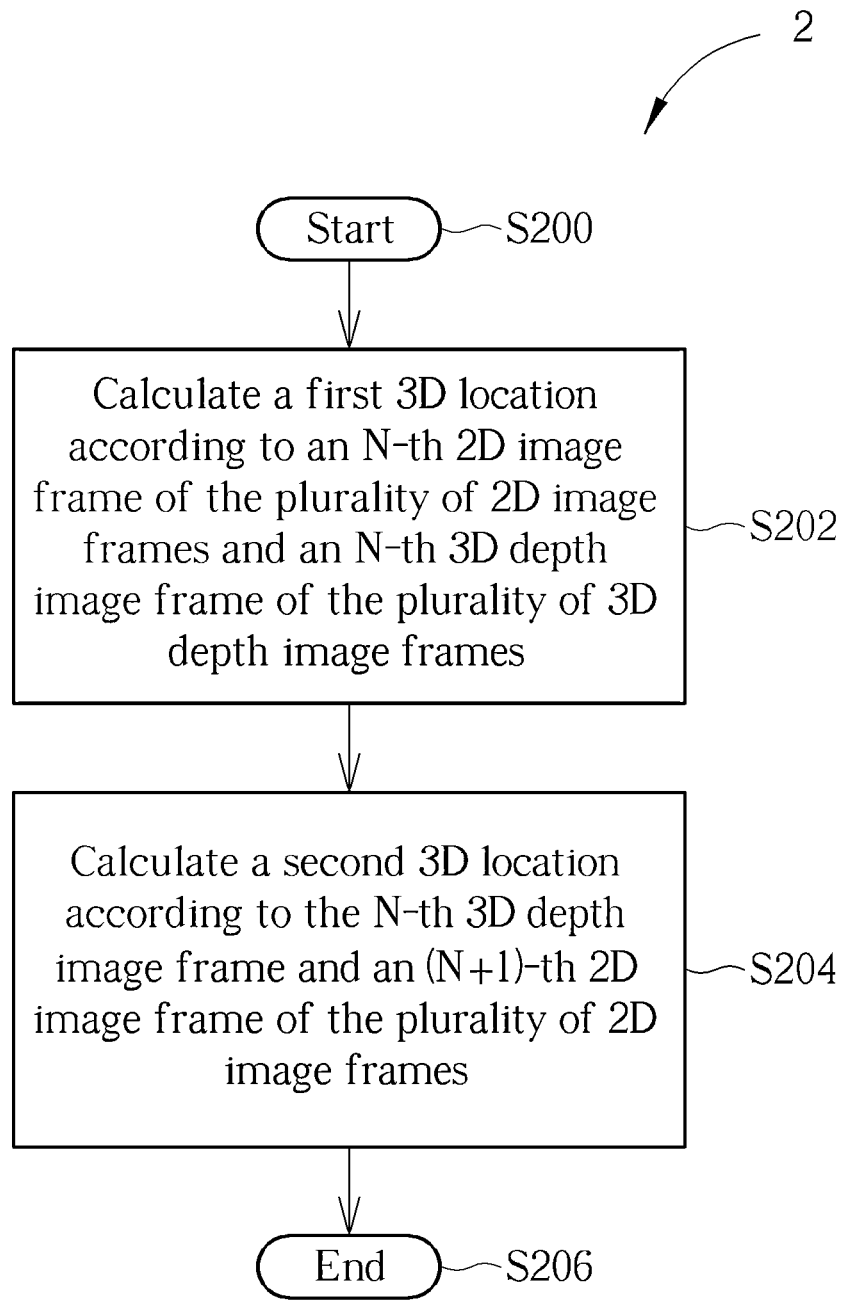
FIG. 2 is a flowchart of a process of a 3D location reporting method according to the embodiment of the present invention.

The 3D location reporting method of the object tracking system 1 may be summarized as a process 2, as shown in FIG. 2. The process 2 includes the following steps:

Step S200: Start.

Step S202: Calculate a first 3D location according to an N-th 2D image frame of the plurality of 2D image frames and an N-th 3D depth image frame of the plurality of 3D depth image frames.

Step S204: Calculate a second 3D location according to the N-th 3D depth image frame and an (N+1)-th 2D image frame of the plurality of 2D image frames.

Step S206: End.

Figure 3:
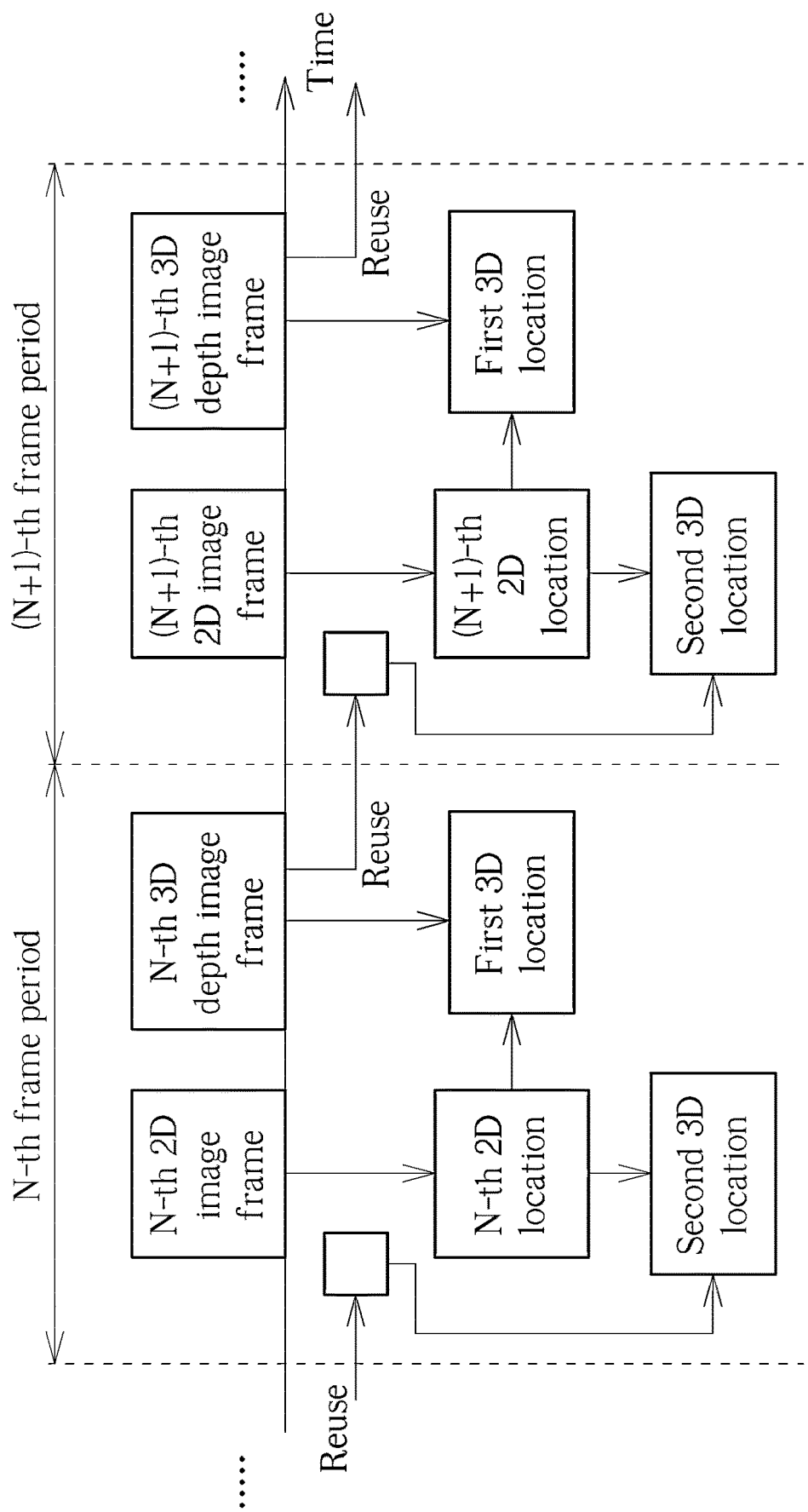
FIG. 3 is a timing diagram of executing the 3D location reporting method according to an embodiment of the present invention.

Please refer to FIG. 3. FIG. 3 is a timing diagram of executing the 3D location reporting method according to an embodiment of the present invention. In one embodiment, the plurality of 2D image frames and the plurality of 3D depth image frames are interleaved, and a first 2D image frame of the plurality of 2D image frames is captured earlier than a first 3D depth image frame of the plurality of 3D depth image frames. Specifically, the sensor 10 may capture one 2D image frame and one 3D depth image frame within each frame period corresponding to the sensor frame rate. For example, the sensor 10 captures the N-th 2D image frame of the plurality of 2D image frames and the N-th 3D depth image frame of the plurality of 3D depth image frames within the N-th frame period.

According to the process 2, in step S202, the processor 20 calculates a first 3D location according to the N-th 2D image frame and the N-th 3D depth image frame. In detail, as shown in FIG. 3, the processor 20 calculates the N-th 2D location corresponding to the N-th 2D image frame, and calculates the first 3D location according to the N-th 2D location and the N-th 3D depth image frame. In step S204, the processor 20 calculates the second 3D location according to the N-th 3D depth image frame corresponding to the N-th 2D image frame and the (N+1)-th 2D location corresponding to the (N+1)-th 2D image frame. In detail, the processor 20 stores the N-th 3D depth image frame calculated within the N-the frame period in the memory 30 and reuses the N-th 3D depth image frame calculated within the N-th frame period to calculate the second 3D location within the (N+1)-th frame period. Identically, the processor 20 may calculate one first 3D location and one second 3D location within each frame period corresponding to the sensor frame rate. In other words, the processor 20 may generate two 3D locations (the first 3D location and the second location) of the landmark of the object within each frame period. In this way, the processor 20 may report one 3D location every half frame period, which means that the reporting rate of the processor 20 for the 3D location is twice the sensor frame rate.

It should be noted that the processor 20 may reuse the 3D depth image frame stored within any previous frame period to calculate the second 3D location within the present frame period, but not limited thereto.

Figure 4A:
FIG. 4A is the 3D depth image frame of a human face tracked by the object tracking system according to an embodiment of the present invention.
Figure 4B:
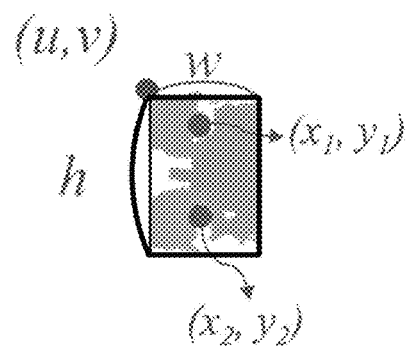
FIG. 4B is a part of the 3D depth image frame around the human face according to an embodiment of the present invention.

As mentioned above, the 3D depth image frame needs to be kept until the next frame period and used together with the 2D location, but keeping the complete 3D depth image frame takes up high usage and long access time of the memory 30. In the present invention, the sensor 10 having a high sensor frame rate is used to ensure that the movement range of each image frame is limited within a certain range. Therefore, the present invention may also optimize and retain a part of 3D depth image frame to calculate the 3D location of the landmark within the next frame period. Please refer to FIGS. 4A and 4B. FIG. 4A is a 3D depth image frame of a human face tracked by the object tracking system 1 according to an embodiment of the present invention. FIG. 4B is a part of the 3D depth image frame around the human face according to an embodiment of the present invention. It should be noted that the object tracking system 1 may track the human eye within the human face, but not limited thereto. In detail, as shown in FIG. 4B, the processor 20 may calculate a target 3D depth image frame corresponding to a region of the human face within the 3D depth image frame. For example, the region is a rectangular region around the human eye, and a length and a width of the rectangular region are h and w respectively. Specifically, the processor 20 may calculate the second 3D location according to the target 3D depth image frame and the (N+1)-th 2D location corresponding to the (N+1)-th 2D image frame of the plurality of 2D image frames. In this way, the 3D location reporting method may reduce the memory usage and access time by avoiding keeping the complete 3D depth image frame in the memory 30.

In addition, the processor 20 may select/determine at least one landmark and obtain the parameters of the region corresponding to the at least one landmark according to the following equations:

$$X = \{x_1, x_2 \ldots x_n\}$$
$$Y = \{y_1, y_2 \ldots y_n\}$$
$$u = \max(\min(X) - \varepsilon_w, 0)$$
$$v = \max(\min(Y) - \varepsilon_h, 0)$$
$$w = \min(\max(X) - u + \varepsilon_w, W - u)$$
$$h = \min(\max(X) - v + \varepsilon_h, H - v)$$

Where (X, Y) represents the coordinate of the at least one landmark, (u, v) represents the coordinate of a starting point of the region corresponding to the at least one landmark, (w, h) represents the width and the length of the region and $\varepsilon_w$ and $\varepsilon_h$ represent the upper limit values of the moving distance of the object between two consecutive frame periods in the horizontal direction and vertical direction respectively.

For example, as shown in FIGS. 4A and 4B, the processor 20 determines the human eye as two landmarks ($x_1$, $y_1$) and ($x_2$, $y_2$). According to the equations, the processor 20 obtains the region corresponding to the landmarks ($x_1$, $y_1$) and ($x_2$, $y_2$). In this way, the processor 20 may calculate the second 3D location according to the target 3D depth image frame corresponding to the region and the (N+1)-th 2D location. In this way, the 3D location reporting method may reduce the memory usage and access time by avoiding keeping the complete 3D depth image frame in the memory 30.

It should be noted that, the processor 20 may obtain multiple regions corresponding to multiple landmarks, and is not limited to one region. For example, the processor 20 may obtain two regions corresponding to human eye respectively.

Those skilled in the art should readily make combinations, modifications and/or alterations on the abovementioned description and examples. The abovementioned description, steps, procedures and/or processes including suggested steps may be realized by means that could be hardware, software, firmware (known as a combination of a hardware device and computer instructions and data that reside as read-only software on the hardware device), an electronic system, or combination thereof. Examples of hardware may include analog, digital and mixed circuits known as microcircuit, microchip, or silicon chip. Examples of the electronic system may include a system on chip (SoC), system in package (SiP), a computer on module (COM) and the air leak detection system 1. Any of the abovementioned procedures and examples above may be compiled into program codes or instructions that are stored in the memory 30. The memory 30 may include read-only memory (ROM), flash memory, random access memory (RAM), subscriber identity module (SIM), hard disk, or CD-ROM/DVD-ROM/BD-ROM, but not limited thereto.

The processor 20 may read and execute the program codes or the instructions stored in the memory 30 for realizing the abovementioned functions.

In summary, in the prior art, only one 3D location may be reported within each frame period. In comparison, the 3D location reporting method of the present invention may report two 3D locations within each frame period. In other words, the reporting rate of the present invention is twice the reporting rate of the prior art. In this way, the present invention maximizes the reporting rate of the 3D locations to achieve a smooth visual experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object tracking system, comprising:
    a sensor, configured to capture a plurality of 2D image frames having a sensor frame rate and a plurality of 3D depth image frames having the sensor frame rate, wherein the plurality of 2D image frames and the plurality of 3D depth image frames are interleaved, and a first 2D image frame of the plurality of 2D image frames is captured earlier than a first 3D depth image frame of the plurality of 3D depth image frames;
    a processor, coupled to the sensor; and
    a memory, coupled to the processor, configured to store a program code for instructing the processor to execute a 3D location reporting method, wherein the 3D location reporting method comprises:
        calculating a first 3D location according to an N-th 2D image frame of the plurality of 2D image frames and an N-th 3D depth image frame of the plurality of 3D depth image frames; and
        calculating a second 3D location according to the N-th 3D depth image frame and an (N+1)-th 2D image frame of the plurality of 2D image frames.

2. The object tracking system of claim 1, wherein the plurality of 2D image frames are near infrared (NIR) image frames or RGB image frames.

3. The object tracking system of claim 1, wherein the step of calculating the first 3D location comprises:
    calculating a plurality of 2D locations respectively corresponding to the plurality of 2D image frames; and
    calculating the first 3D location according to an N-th 2D location corresponding to the N-th 2D image frame of the plurality of 2D image frames and the N-th 3D depth image frame of the plurality of 3D depth image frames.

4. The object tracking system of claim 3, wherein the step of calculating the second 3D location further comprises:
    calculating the second 3D location according to the N-th 3D depth image frame and an (N+1)-th 2D location corresponding to the (N+1)-th 2D image frame of the plurality of 2D image frames.

5. The object tracking system of claim 3, wherein the step of calculating the second 3D location further comprises:
    calculating a target 3D depth image frame corresponding to a region of an object within the N-th 3D depth image frame; and
    calculating the second 3D location according to the target 3D depth image frame and an (N+1)-th 2D location corresponding to the (N+1)-th 2D image frame of the plurality of 2D image frames.

6. A 3D location reporting method, comprising:
    capturing a plurality of 2D image frames having a sensor frame rate and a plurality of 3D depth image frames having the sensor frame rate, wherein the plurality of 2D image frames and the plurality of 3D depth image frames are interleaved, and a first 2D image frame of the plurality of 2D image frames is captured earlier than a first 3D depth image frame of the plurality of 3D depth image frames;
    calculating a first 3D location according to an N-th 2D image frame of the plurality of 2D image frames and an N-th 3D depth image frame of the plurality of 3D depth image frames; and
    calculating a second 3D location according to the N-th 3D depth image frame and an (N+1)-th 2D image frame of the plurality of 2D image frames.

7. The 3D location reporting method of claim 6, wherein the plurality of 2D image frames are near infrared (NIR) image frames or RGB image frames.

8. The 3D location reporting method of claim 6, wherein the step of calculating the first 3D location comprises:
    calculating a plurality of 2D locations respectively corresponding to the plurality of 2D image frames; and
    calculating the first 3D location according to an N-th 2D location corresponding to the N-th 2D image frame of the plurality of 2D image frames and the N-th 3D depth image frame of the plurality of 3D depth image frames.

9. The 3D location reporting method of claim 8, wherein the step of calculating the second 3D location further comprises:
    calculating the second 3D location according to the N-th 3D depth image frame and an (N+1)-th 2D location corresponding to the (N+1)-th 2D image frame of the plurality of 2D image frames.

10. The 3D location reporting method of claim 8, wherein the step of calculating the second 3D location further comprises:
    calculating a target 3D depth image frame corresponding to a region of an object within the N-th 3D depth image frame; and
    calculating the second 3D location according to the target 3D depth image frame and an (N+1)-th 2D location corresponding to the (N+1)-th 2D image frame of the plurality of 2D image frames.

\* \* \* \* \*